United States Patent
Matsumura (10) Patent No.: US 9,647,870 B2
(45) Date of Patent: May 9, 2017

(54) RELAY APPARATUS, SYSTEM, AND COMPUTER-READABLE MEDIUM

(71) Applicant: FUJI XEROX CO., LTD., Minato-ku, Tokyo (JP)

(72) Inventor: Ryoji Matsumura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 238 days.

(21) Appl. No.: 14/034,762

(22) Filed: Sep. 24, 2013

(65) Prior Publication Data
US 2014/0258377 A1    Sep. 11, 2014

(30) Foreign Application Priority Data

Mar. 5, 2013 (JP) ................. 2013-043209

(51) Int. Cl.
  *G06F 3/00* (2006.01)
  *G06F 5/00* (2006.01)
  (Continued)

(52) U.S. Cl.
  CPC .... *H04L 29/06047* (2013.01); *H04L 67/1097* (2013.01); *H04L 67/2823* (2013.01); *H04L 67/327* (2013.01)

(58) Field of Classification Search
  CPC ................. H04L 29/06047; G06F 17/30079
  See application file for complete search history.

(56) References Cited

U.S. PATENT DOCUMENTS

2007/0088702 A1\* 4/2007 Fridella et al. ............. 707/10
2007/0156842 A1\* 7/2007 Vermeulen et al. ......... 709/217
(Continued)

FOREIGN PATENT DOCUMENTS

JP   11110361 A    4/1999
JP   11-232154 A   8/1999
(Continued)

OTHER PUBLICATIONS

Communication dated Jan. 5, 2016, from the Japanese Patent Office in counterpart application No. 2013-043209.
Communication dated Aug. 9, 2016 from the Japanese Patent Office in counterpart application No. 2013-043209.
Communication dated Feb. 14, 2017 from the Japanese Patent Office in counterpart Application No. 2013-043209.

*Primary Examiner* — Nicholas Taylor
*Assistant Examiner* — Sanjoy Roy
(74) *Attorney, Agent, or Firm* — Sughrue Mion, PLLC (57) ABSTRACT

A relay apparatus includes a storage, and request data reception and transmission units, first and second conversion units, and content identifier reception and transmission units. For each storage service, the storage stores a service identifier, access destination information, and a conversion routine for converting a content identifier and a specified condition for specifying content between a server format and a client apparatus format. The request data reception unit receives a service identifier and a specified condition from a client apparatus. The first conversion unit converts the specified condition into a server format. The request data transmission unit transmits the resulting specified condition according to the access destination information. The content identifier reception unit receives a content identifier from a server. The second conversion unit converts the received content identifier into the client apparatus format. The content identifier transmission unit transmits the resulting content identifier to the client apparatus.

7 Claims, 8 Drawing Sheets

(51) Int. Cl.
*H04L 29/06* (2006.01)
*H04L 29/08* (2006.01)

(56) References Cited

U.S. PATENT DOCUMENTS

| | | | |
|---|---|---|---|
| 2010/0325199 A1* | 12/2010 | Park et al. | 709/203 |
| 2012/0089630 A1* | 4/2012 | Gilula | G06F 17/30398 707/765 |
| 2012/0179703 A1* | 7/2012 | Ajitomi | G06F 17/30386 707/765 |
| 2013/0124552 A1* | 5/2013 | Stevenson | G06F 17/30864 707/759 |
| 2013/0226876 A1* | 8/2013 | Gati et al. | 707/652 |

FOREIGN PATENT DOCUMENTS

| | | |
|---|---|---|
| JP | 2005174120 A | 6/2005 |
| JP | 200685364 A | 3/2006 |
| JP | 2011003187 A | 1/2011 |
| JP | 2012-113701 A | 6/2012 |

* cited by examiner

| SVC IDENTIFIER | ACCESS DESTINATION | IDENTIFIER CONVERSION ROUTINE | CONDITIONAL EXPRESSION CONVERSION ROUTINE |
|---|---|---|---|
| id:svc:service-A | http://www.serviceA | ConvertIDForA() | ConvertCondForA() |
| id:svc:service-B | http://www.serviceB | ConvertIDForB() | ConvertCondForB() |
| ⋮ | ⋮ | ⋮ | ⋮ |

RELAY APPARATUS, SYSTEM, AND COMPUTER-READABLE MEDIUM

CROSS-REFERENCE TO RELATED APPLICATIONS

This application is based on and claims priority under 35 USC 119 from Japanese Patent Application No. 2013-043209 filed Mar. 5, 2013.

BACKGROUND (i) Technical Field

The present invention relates to a relay apparatus, a system, and a computer-readable medium.

(ii) Related Art

A service called a cloud service or cloud computing is known. In such a service, for example, servers on a network, instead of client apparatuses, perform various types of information processing, such as data storage and data format conversion. In the field of such a service, a technique has been proposed in which communication is relayed between a server and client apparatuses.

SUMMARY

According to an aspect of the present invention, there is provided a relay apparatus including a storage, and a request data reception unit, a first conversion unit, a request data transmission unit, a content identifier reception unit, a second conversion unit, and a content identifier transmission unit. The storage stores a service identifier, access destination information, and a conversion routine in such a manner that the service identifier, the access destination information, and the conversion routine are associated with each other, for each of multiple storage services. The service identifier is an identifier for identifying the storage service. The access destination information indicates information used to access a server which provides the storage service. The conversion routine indicates a rule for converting a content identifier for identifying content and a specified condition indicating a condition used to specify one or more pieces of content between a format used in the server providing the storage service and a format used in a client apparatus. The request data reception unit receives first request data including a service identifier and a specified condition from the client apparatus. The first conversion unit converts the specified condition included in the first request data into the format used in the server, in accordance with a conversion routine stored in the storage in such a manner that the conversion routine is associated with the service identifier included in the first request data received by the request data reception unit. The request data transmission unit transmits second request data including the specified condition obtained through the conversion performed by the first conversion unit, in accordance with the access destination information stored in the storage in such a manner that the access destination information is associated with the service identifier included in the first request data received by the request data reception unit. The content identifier reception unit receives a content identifier transmitted from the server as a response to the second request data transmitted by the request data transmission unit. The second conversion unit converts the content identifier received by the content identifier reception unit into the format used in the client apparatus in accordance with a conversion routine stored in the storage in such a manner that the conversion routine is associated with the service identifier of the storage service provided by the server which has transmitted the content identifier. The content identifier transmission unit transmits the content identifier obtained through the conversion performed by the second conversion unit, as a response to the first request data received by the request data reception unit to the client apparatus.

BRIEF DESCRIPTION OF THE DRAWINGS

Exemplary embodiments of the present invention will be described in detail based on the following figures, wherein.

DETAILED DESCRIPTION

1. Exemplary Embodiment

1-1. Overall Configuration

Figure 1:
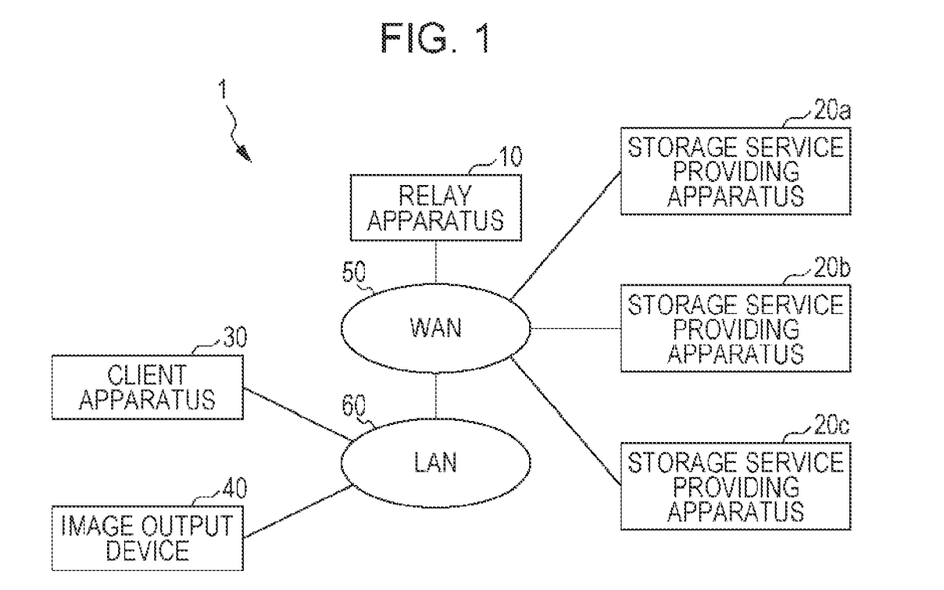
FIG. 1 is a block diagram illustrating the overall configuration of a communication system.

FIG. 1 is a block diagram illustrating the overall configuration of a communication system 1 according to an exemplary embodiment of the present invention. The communication system 1 includes a relay apparatus 10, storage service providing apparatuses 20a, 20b, and 20c, a client apparatus 30, an image output device 40, a wide area network (WAN) 50, and a local area network (LAN) 60. The storage service providing apparatuses 20a, 20b, and 20c are apparatuses, each of which provide a so-called storage service. The WAN 50 is a communication line in a wide area which connects the relay apparatus 10, the storage service providing apparatuses 20a, 20b, and 20c, and the LAN 60 to each other, and which transfers information transmitted and received between these. The WAN 50 is, for example, the Internet.

The LAN 60 is a communication line which is connected to the client apparatus 30 and the image output device 40, and which transfers information transmitted and received between these and the WAN 50. A gateway server (not illustrated) connected to the WAN 50 is provided for the LAN 60. The gateway server permits communication from an apparatus connected to the LAN 60 (hereinafter, referred to as a LAN 60 side apparatus) to an apparatus connected to the WAN 50 (hereinafter, referred to as a WAN 50 side apparatus). In contrast, for communication from a WAN 50 side apparatus to a LAN 60 side apparatus, the gateway server permits only responses to communication requested by the LAN 60 side apparatus, and interrupts communication other than the responses. That is, the gateway server functions as a so-called firewall.

The client apparatus 30 is connected to the LAN 60, and is an apparatus for receiving a user operation and specifying output of content indicated by the operation to the relay apparatus 10. The client apparatus 30 is, for example, a smartphone or a tablet personal computer.

The relay apparatus 10 is connected to the WAN 50, and is an apparatus for providing requested content to the image output device 40. The relay apparatus 10 receives the specification from the client apparatus 30, and obtains the content indicated by the specification from either of the storage service providing apparatuses 20*a*, 20*b*, and 20*c*. The relay apparatus 10 stores the obtained content in itself, and notifies the client apparatus 30 of the uniform resource identifier (URI) which indicates the storage location of the content.

The storage service providing apparatuses 20*a*, 20*b*, and 20*c* are servers connected to the WAN 50, and store content. The storage service providing apparatuses 20*a*, 20*b*, and 20*c* receive a request to obtain content, from the relay apparatus 10, and provide the requested content to the relay apparatus 10. The storage service providing apparatuses 20*a*, 20*b*, and 20*c* receive/transmit data from/to another apparatus in different formats. Although the formats in which the storage service providing apparatuses 20*a*, 20*b*, and 20*c* receive/transmit data from/to another apparatus are different from each other, each of the storage service providing apparatuses 20*a*, 20*b*, and 20*c* has a similar hardware configuration, and performs a similar operation. Hereinafter, except in the case where the storage service providing apparatuses 20*a*, 20*b*, and 20*c* are to be separately described, each of the storage service providing apparatuses 20*a*, 20*b*, and 20*c* is called a storage service providing apparatus 20.

The image output device 40 obtains the URI transmitted from the relay apparatus 10 to the client apparatus 30, from the client apparatus 30. The image output device 40 uses the obtained URI to request the content stored in the storage area indicated by the URI, from the relay apparatus 10. Receiving the request, the relay apparatus 10 provides the content to the image output device 40. The image output device 40 outputs the content provided from the relay apparatus 10. The image output device 40 is, for example, an electrophotographic image forming apparatus, and outputs the content by forming an image indicated by the content on a medium such as paper.

1-2. Configuration of Relay Apparatus

Figure 2A:
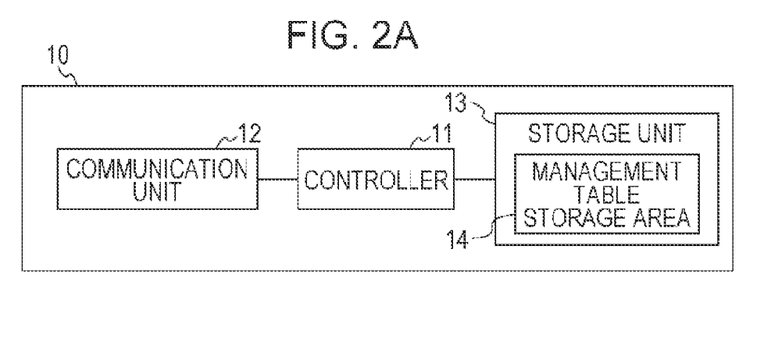
FIG. 2A is a diagram illustrating the hardware configuration of a relay apparatus.

FIG. 2A is a diagram illustrating the configuration of the relay apparatus 10. In FIG. 2A, a controller 11 includes an arithmetic and logic unit such as a central processing unit (CPU) and main storages, such as a read only memory (ROM) and a random access memory (RAM). The arithmetic and logic unit uses the RAM as a work area and executes programs stored in the ROM or a storage unit 13, thereby controlling operations of units of the relay apparatus 10. A communication unit 12 is an interface for communicating via the WAN 50 to another apparatus. The storage unit 13 is a storage device such as a hard disk, and stores data and programs which are used by the controller 11. The storage unit 13 has a management table storage area 14. The management table storage area 14 stores information for accessing the storage service providing apparatuses 20.

Figure 2B:
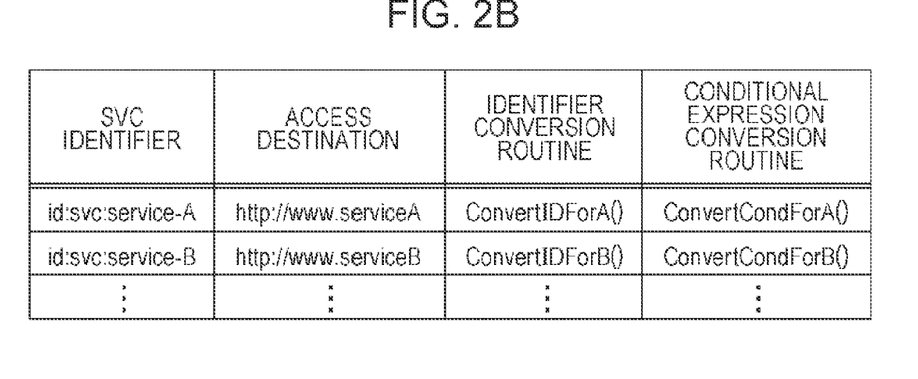
FIG. 2B is a diagram illustrating an exemplary management table.

FIG. 2B is a diagram illustrating an exemplary management table. As illustrated in FIG. 2B, items "SVC identifier", "access destination", "identifier conversion routine", and "conditional expression conversion routine", are stored in the table in such a manner as to be associated with each other. Among these items, a service identifier for identifying a storage service is stored in the item "SVC identifier". Access destination information indicating information for accessing a storage service providing apparatus 20 which provides a storage service is stored in the item "access destination". In the exemplary embodiment, a URI is stored as access destination information. An identifier conversion routine indicating rules for converting a content identifier identifying content and a folder identifier (exemplary specified condition) identifying a folder between the format used in a storage service providing apparatus 20 and the format used in the client apparatus 30 is stored in the item "identifier conversion routine". In the exemplary embodiment, it is assumed that each storage service uses a different format for a content identifier and a folder identifier. In the example illustrated in FIG. 2B, for example, a service identifier "service-A" is associated with an identifier conversion routine "ConvertIDForA( )". A conditional expression conversion routine indicating a rule for converting a specified condition indicating a condition for specifying one or more pieces of content between the format used in a storage service providing apparatus 20 and the format used in the client apparatus 30 is stored in the item "conditional expression conversion routine".

The relay apparatus 10 and the client apparatus 30 receive/transmit data from/to each other in a format which is independent of data formats defined in the storage services. The "identifier conversion routine" is used to convert a content identifier and a folder identifier described in a format used in data communication between the client apparatus 30 and the relay apparatus 10 into identifiers in a format corresponding to each of the storage services. The "conditional expression conversion routine" is used to convert a conditional expression described in a format used in data communication between the client apparatus 30 and the relay apparatus 10 into a conditional expression in a format corresponding to each of the storage services.

1-3. Configuration of Storage Service Providing Apparatus

Figure 3:
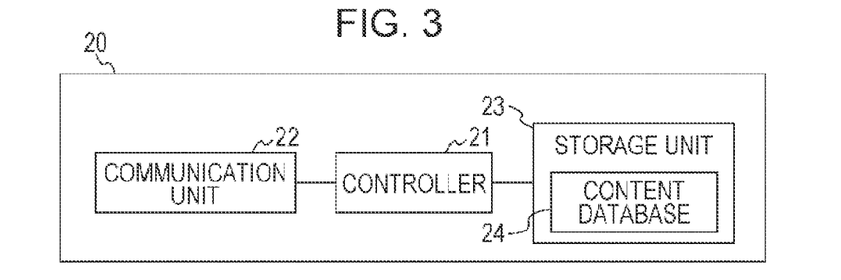
FIG. 3 is a diagram illustrating the hardware configuration of a storage service providing apparatus.

FIG. 3 is a diagram illustrating the configuration of a storage service providing apparatus 20. In FIG. 3, a controller 21 includes an arithmetic and logic unit such as a CPU and main storages, such as a ROM and a RAM. The arithmetic and logic unit uses the RAM as a work area and executes programs stored in the ROM or a storage unit 23, thereby controlling operations of units of the storage service providing apparatus 20. A communication unit 22 is an interface for communicating via the WAN 50 to another apparatus. The storage unit 23 is a storage device such as a hard disk, and stores data and programs which are used by the controller 21.

The storage unit 23 includes a content database 24 which stores content associated with information indicating the storage location of the content. Responding to a request from the relay apparatus 10, the controller 21 reads out content from the content database 24 and provides it. In the exemplary embodiment, "content" is used as a term representing data indicating various documents, images, and the like, such as document data representing a document or image data representing an image. Other than that, for example, "content" may be a computer program, and a set of data is called "content". In the exemplary embodiment, the content database 24 includes a table in which URIs such as "http://z**.com/C001" are described, as information indicating the storage location of content. Each URI is associated with a storage area for content.

1-4. Configuration of Client Apparatus

Figure 4:
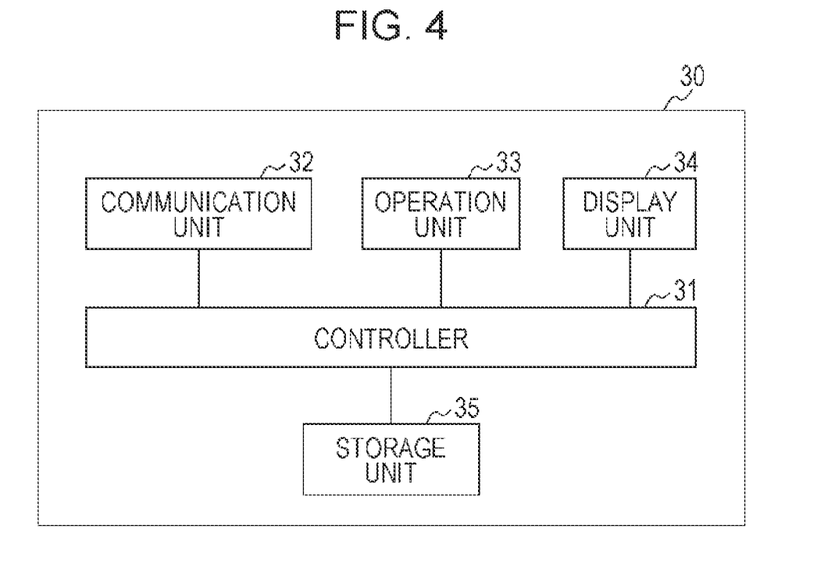
FIG. 4 is a diagram illustrating the hardware configuration of a client apparatus.

FIG. 4 is a diagram illustrating the hardware configuration of the client apparatus 30. In FIG. 4, a controller 31 includes an arithmetic and logic unit such as a CPU and main storages, such as a ROM and a RAM. The ROM stores programs executed by the arithmetic and logic unit. The arithmetic and logic unit uses the RAM as a work area and executes programs stored in the ROM or a storage unit 35, thereby controlling operations of units of the client apparatus 30. A communication unit 32 is an interface for communicating via the LAN 60 to another apparatus. An operation unit 33 includes operators, such as various keys and a touch sensor, and supplies an operation signal corresponding to a user operation to the controller 31. The controller 31 performs processing corresponding to the operation signal. A display unit 34 includes a liquid crystal panel and a liquid-crystal driving circuit, and displays an image under the control performed by the controller 31. The storage unit 35 is a storage device such as a hard disk, and stores data and programs which are used by the controller 31.

1-5. Configuration of Image Output Device

Figure 5:
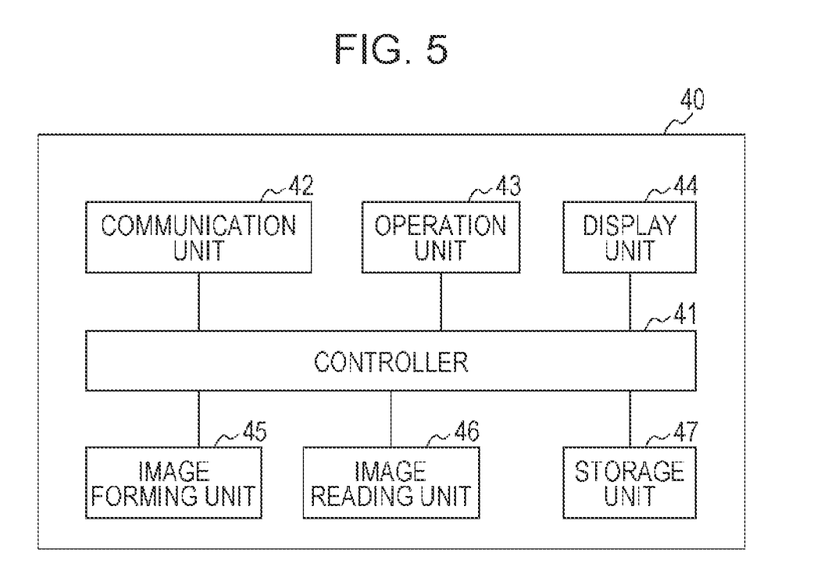
FIG. 5 is a diagram illustrating the hardware configuration of an image output device.

FIG. 5 is a diagram illustrating the hardware configuration of the image output device 40. In FIG. 5, a controller 41 includes an arithmetic and logic unit such as a CPU and main storages, such as a ROM and a RAM. The ROM stores programs executed by the arithmetic and logic unit. The arithmetic and logic unit uses the RAM as a work area and executes programs stored in the ROM or a storage unit 47, thereby controlling operations of units of the image output device 40. A communication unit 42 is an interface for communicating via the LAN 60 to another apparatus. An operation unit 43 includes operators, such as various keys and a touch sensor, and supplies an operation signal corresponding to a user operation to the controller 41. The controller 41 performs processing corresponding to the operation signal. A display unit 44 includes a liquid crystal panel and a liquid-crystal driving circuit, and displays an image under the control performed by the controller 41. An image forming unit 45 forms an image by using an electrophotographic system. An image reading unit 46 optically reads out an image on a document. The storage unit 47 is a storage device such as a hard disk, and stores data and programs which are used by the controller 41.

Figure 6:
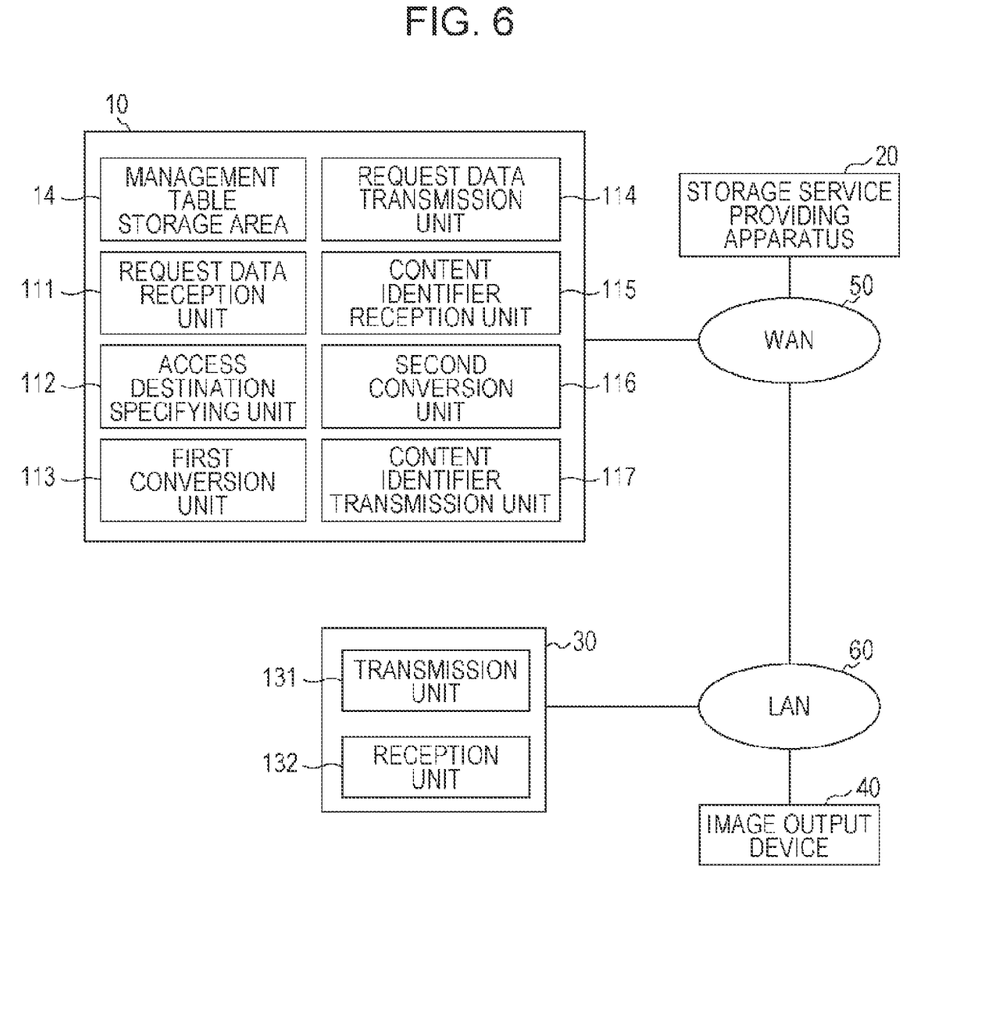
FIG. 6 is a diagram illustrating a functional configuration of the relay apparatus and the client apparatus.

FIG. 6 is a diagram illustrating a functional configuration of the relay apparatus 10 and the client apparatus 30. The relay apparatus 10 causes the controller 11, or the controller 11 and the communication unit 12, to achieve functions of a request data reception unit 111, an access destination specifying unit 112, a first conversion unit 113, a request data transmission unit 114, a content identifier reception unit 115, a second conversion unit 116, and a content identifier transmission unit 117.

The request data reception unit 111 receives request data including a service identifier and a specified condition from the client apparatus 30. In the exemplary embodiment, a folder identifier for specifying a folder and a conditional expression for specifying a search condition are used as a specified condition. The access destination specifying unit 112 refers to the stored data in the management table storage area 14 to specify an access destination corresponding to the service identifier included in the request data received by the request data reception unit 111.

The first conversion unit 113 refers to the stored data in the management table storage area 14 to specify an identifier conversion routine corresponding to the service identifier included in the request data received by the request data reception unit 111, and uses the specified identifier conversion routine to convert the specified condition included in the received request data. The request data transmission unit 114 transmits request data including the specified condition obtained through conversion performed by the first conversion unit 113 to a storage service providing apparatus 20 which corresponds to the access destination specified by the access destination specifying unit 112.

The content identifier reception unit 115 receives content identifiers transmitted from the storage service providing apparatus 20 as a response to the request data which has been transmitted by the request data transmission unit 114. The second conversion unit 116 converts the content identifiers received by the content identifier reception unit 115 by using an identifier conversion routine stored in the management table storage area 14 in such a manner that the identifier conversion routine is associated with the service identifier of the storage service providing apparatus 20 which has transmitted the content identifiers. The content identifier transmission unit 117 transmits the content identifiers obtained through conversion performed by the second conversion unit 116 to the client apparatus 30 as a response to the request data received by the request data reception unit 111.

The client apparatus 30 causes the controller 31, or the controller 31 and the communication unit 32, to achieve functions of a transmission unit 131 and a reception unit 132. The transmission unit 131 transmits a request data including a service identifier and a specified condition to the relay apparatus 10. The reception unit 132 receives content identifiers transmitted from the relay apparatus 10 as a response to the request data which has been transmitted by the transmission unit 131.

1-6. Operation 1-6-1. Operation of Obtaining Content List

An exemplary operation according to the exemplary embodiment will be described. An operation performed when a content list is to be obtained from a folder in a storage service specified by a user will be described with reference to FIG. 7. In the description below, the storage service provided by the storage service providing apparatus 20a is called "storage service A", and the storage service provided by the storage service providing apparatus 20b is called "storage service B". In the example in FIG. 7, an operation performed when a list of documents (content) stored in the storage service A is to be obtained will be described.

Figure 7:
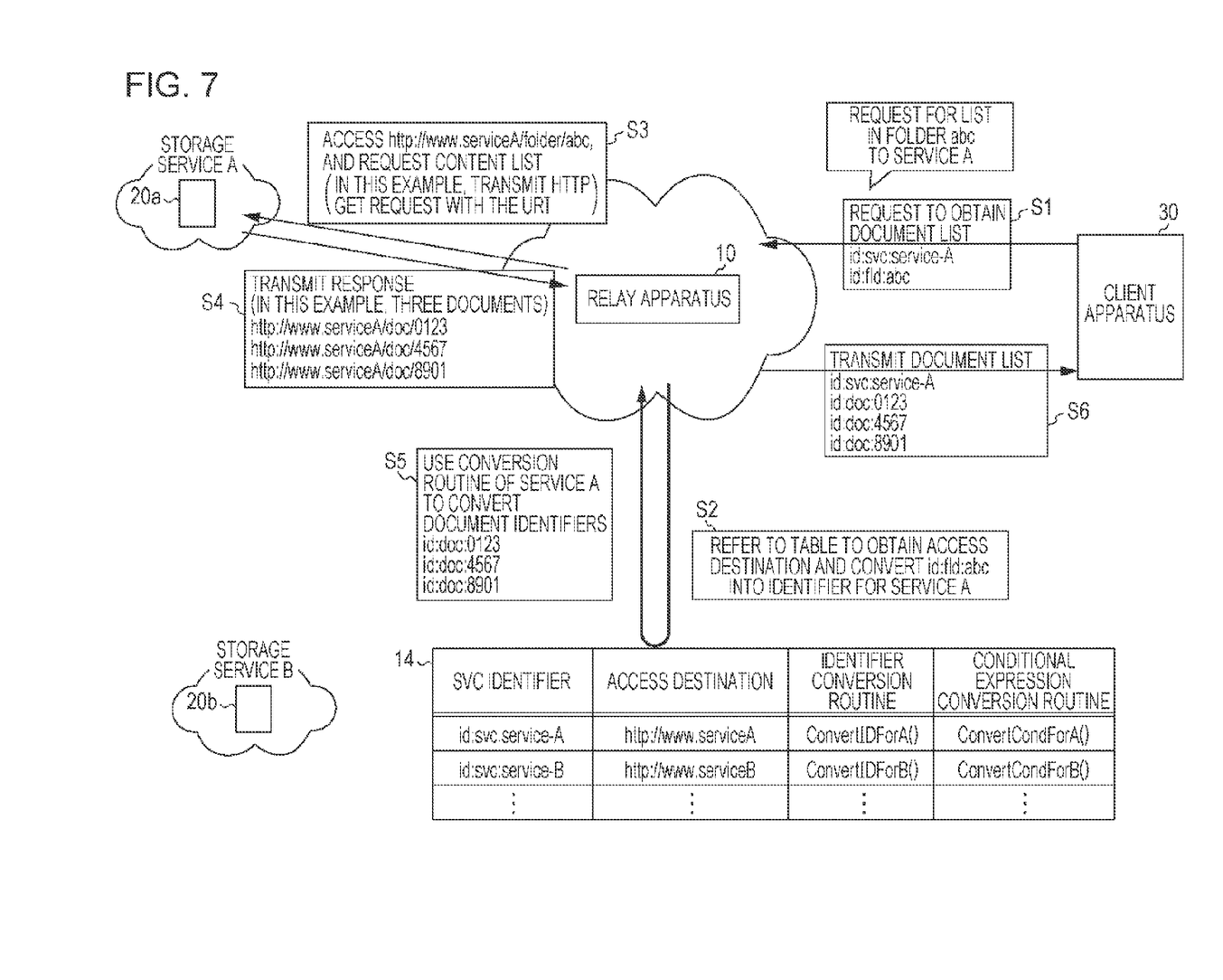
FIG. 7 is a diagram for describing an operation of obtaining a content list.

A user U operates the operation unit 33, and transmits an instruction to display a list of content stored in a folder abc in the storage service A. The controller 31 of the client apparatus 30 transmits acquisition request data which indicates a request to acquire a content list, to the relay apparatus 10 in accordance with information which is output from the operation unit 33 (in step S1). The acquisition request data includes a service identifier for identifying a storage service and a folder identifier for identifying a folder. Specifically, in the exemplary operation, the acquisition request data includes "id:svc:service-A" as a service identifier and "id:fld:abc" as a folder identifier.

Receiving the acquisition request data from the client apparatus 30, the controller 11 of the relay apparatus 10 refers to the stored data in the management table storage area 14 to specify an identifier conversion routine corresponding to the service identifier included in the received acquisition request data. The controller 11 of the relay apparatus 10 uses the specified identifier conversion routine to convert the folder identifier included in the received acquisition request data into a folder identifier in the format used in the specified storage service (in step S2). In the exemplary operation, the folder identifier "id:fld:abc" is converted into "folder/abc" by using the identifier conversion routine "ConvertIDForA( )".

The controller 11 transmits request data for acquiring a content list to an access destination corresponding to the service identifier included in the acquisition request data received in step S1 (in step S3). In the exemplary operation, the controller 11 transmits a HTTP GET request in which "http://www.serviceA/folder/abc" is specified as a URI.

Receiving the acquisition request data transmitted from the relay apparatus 10, the storage service providing apparatus 20a transmits a list of content identifiers in the folder specified in the received acquisition request data to the relay apparatus 10 (in step S4). At that time, a storage service providing apparatus 20 uses a content identifier in the format predetermined in the storage service of the storage service providing apparatus 20. Specifically, in the exemplary operation in FIG. 7, "http://www.serviceA/doc/0123", "http://www.serviceA/doc/4567", and "http://www.serviceA/doc/8901" are transmitted to the relay apparatus 10 as content identifiers.

Receiving the content list from the storage service providing apparatus 20, the controller 11 of the relay apparatus 10 uses the identifier conversion routine stored in the management table to convert the received content identifiers (in step S5). In the example in FIG. 7, a content identifier "doc/0123" is converted into "id:doc:0123" by using the identifier conversion routine.

The controller 11 of the relay apparatus 10 transmits a list of the content identifiers obtained through conversion to the client apparatus 30 (in step S6). The client apparatus 30 displays the list of content identifiers received from the relay apparatus 10 on the display unit 34.

1-6-2. Operation of Outputting Content

Figure 8:
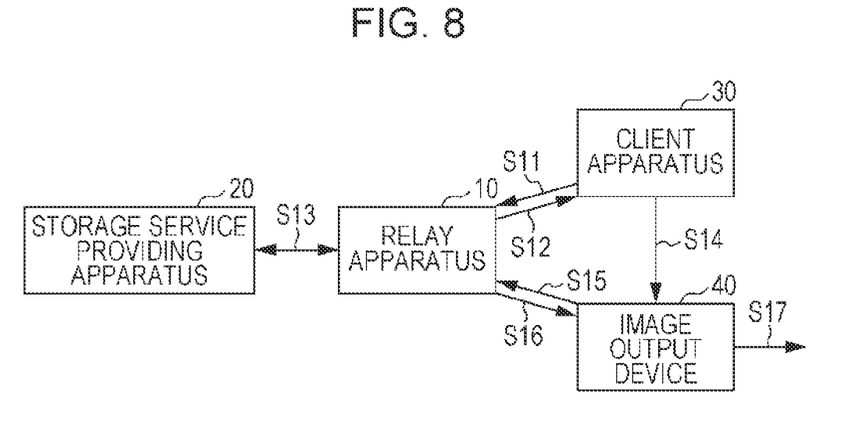
FIG. 8 is a diagram for describing an operation of outputting content.

An operation of outputting content will be described with reference to FIG. 8. The user U uses the operation unit 33 to select a piece of content from the list displayed on the display unit 34. The client apparatus 30 transmits an output instruction to output the selected content, to the relay apparatus 10 in accordance with information which is output from the operation unit 33 (in step S11). The output instruction includes either of the content identifiers displayed in the content list.

Receiving the output instruction from the client apparatus 30, the controller 11 of the relay apparatus 10 obtains content corresponding to the content identifier included in the received output instruction from the storage service providing apparatus 20, stores it in itself, and transmits a URI (acquisition destination information) indicating the storage location of the content to the client apparatus 30 (in step S12). The controller 11 performs a preparative process for obtaining the content which has been obtained from the storage service providing apparatus 20 (in step S13). Specifically, in the exemplary operation, when the data format of the content specified by the user U is not a data format in which the image output device 40 is capable of displaying content, the controller 11 converts the content into the data format in which the image output device 40 is capable of displaying content. In this case, the acquisition destination information transmitted in step S12 indicates a storage area for the content obtained through conversion.

Receiving the acquisition destination information of the content from the relay apparatus 10, the client apparatus 30 transmits the received acquisition destination information to the image output device 40, thereby notifying the image output device 40 of the acquisition destination information of the content (in step S14). Receiving the acquisition destination information from the client apparatus 30, the image output device 40 accesses the storage location indicated by the received acquisition destination information (in step S15). The relay apparatus 10 transmits the content stored in the accessed storage location (in step S16). The image output device 40 outputs an image represented by the content transmitted from the relay apparatus 10 by using the image forming unit 45 (in step S17).

1-6-3. Operation of Obtaining Content List from Folders in Multiple Storage Services An operation performed when a content list from folders in multiple storage services is to be obtained will be described with reference to FIG. 9.

Figure 9:
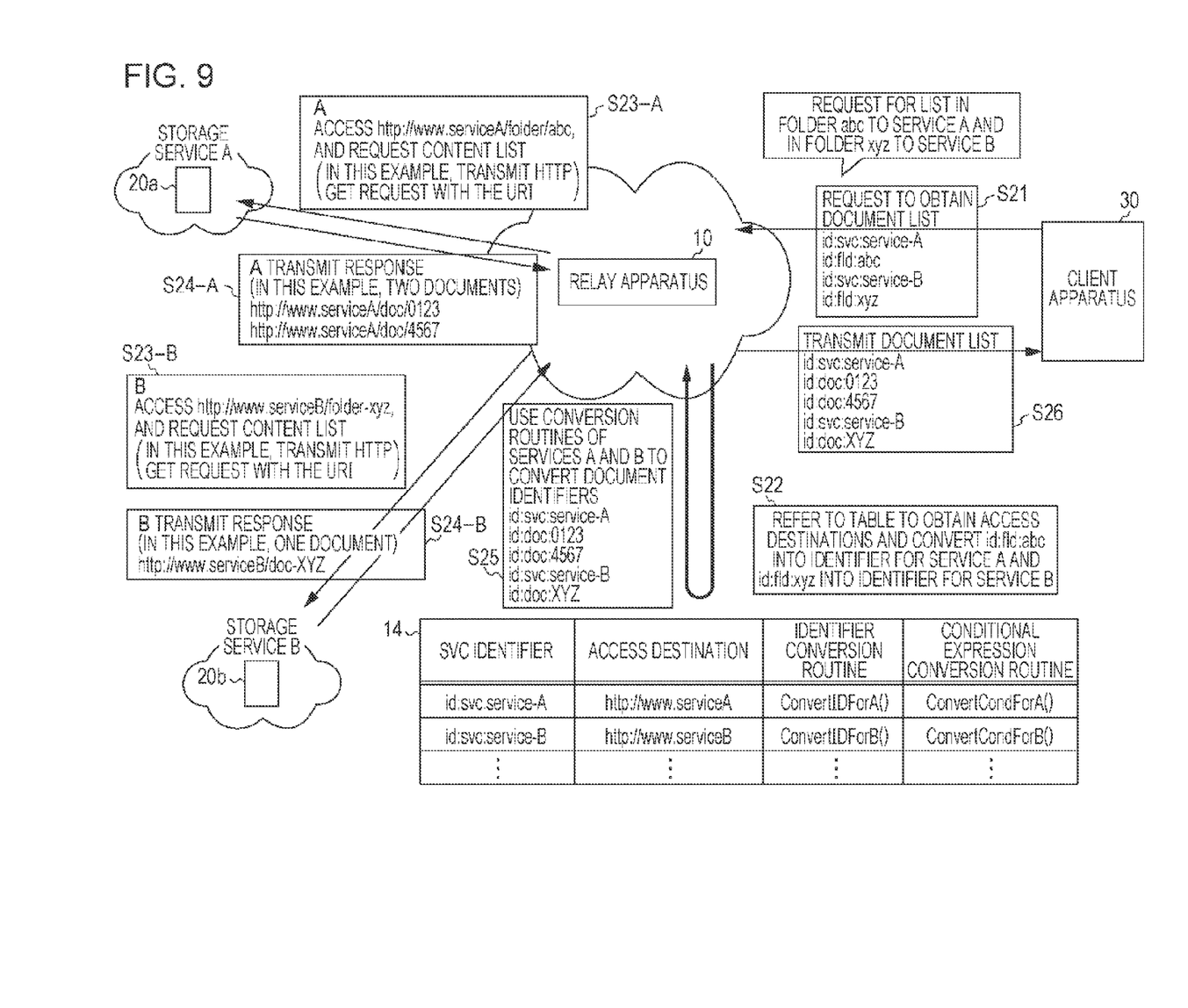
FIG. 9 is a diagram for describing an operation of obtaining a content list.

A user U operates the operation unit 33, and transmits an instruction to display a list of content stored in the folder abc in the storage service A and a folder xyz in the storage service B. The controller 31 of the client apparatus 30 transmits acquisition request data indicating a request to obtain a content list, to the relay apparatus 10 in accordance with information which is output from the operation unit 33 (in step S21). The acquisition request data includes service identifiers for identifying storage services and folder identifiers for identifying folders. Specifically, in the exemplary operation, the acquisition request data includes a pair of a service identifier "id:svc:service-A" and a folder identifier "id:fld:abc", and a pair of a service identifier "id:svc:service-B" and a folder identifier "id:fld:xyz".

Receiving the acquisition request data for a content list from the client apparatus 30, the relay apparatus 10 specifies identifier conversion routines corresponding to the storage services included in the received acquisition request data by using the management table stored in the management table storage area 14, and uses the specified identifier conversion routines to convert the folder identifiers included in the received acquisition request into folder identifiers based on the systems defined in the storage services (in step S22). In the exemplary operation, the folder identifier "id:fld:abc" is converted into "folder/abc" by using the identifier conversion routine "ConvertIDForA( )", and the folder identifier "id:fld:xyz" is converted into "folder-xyz" by using an identifier conversion routine "ConvertIDForB( )".

The controller 11 transmits requests to obtain a content list to access destinations corresponding to the service identifiers included in the acquisition request received in step S21 (in steps S23-A and S23-B). In the exemplary embodiment, the controller 11 transmits an HTTP GET request to a destination "http://www.serviceA/folder/abc", and transmits an HTTP GET request to a destination "http://www.serviceB/folder-xyz".

Receiving an acquisition request transmitted from the relay apparatus 10, a storage service providing apparatus 20 transmits a list of content identifiers in the folder specified in the received acquisition request to the relay apparatus 10 (in steps S24-A and S24-B). At that time, a storage service providing apparatus 20 uses a content identifier in the format according to a protocol predetermined in the storage service providing apparatus 20. Specifically, in the exemplary operation in FIG. 9, the storage service providing apparatus 20a transmits "http://www.serviceA/doc/0123" and "http://www.serviceA/doc/4567" as content identifiers to the relay apparatus 10, and the storage service providing apparatus 20b transmits "http://www.serviceB/doc-XYZ" as a content identifier to the relay apparatus 10.

Receiving content lists from the storage service providing apparatuses 20a and 20b, the controller 11 of the relay apparatus 10 uses the identifier conversion routines stored in the management table storage area 14 to convert the received content identifiers (in step S25). The controller 11 of the relay apparatus 10 transmits a list of the content identifiers obtained through conversion to the client apparatus 30 (in step S26). The client apparatus 30 displays the list of content identifiers received from the relay apparatus 10 on the display unit 34.

As described above, in the exemplary embodiment, in the case where a folder in the storage service A and a folder in the storage service B are specified, a user specifies the folders in a single operation, and does not need to perform an operation for each of the storage services.

1-6-4. Operation of Searching for Content

Figure 10:
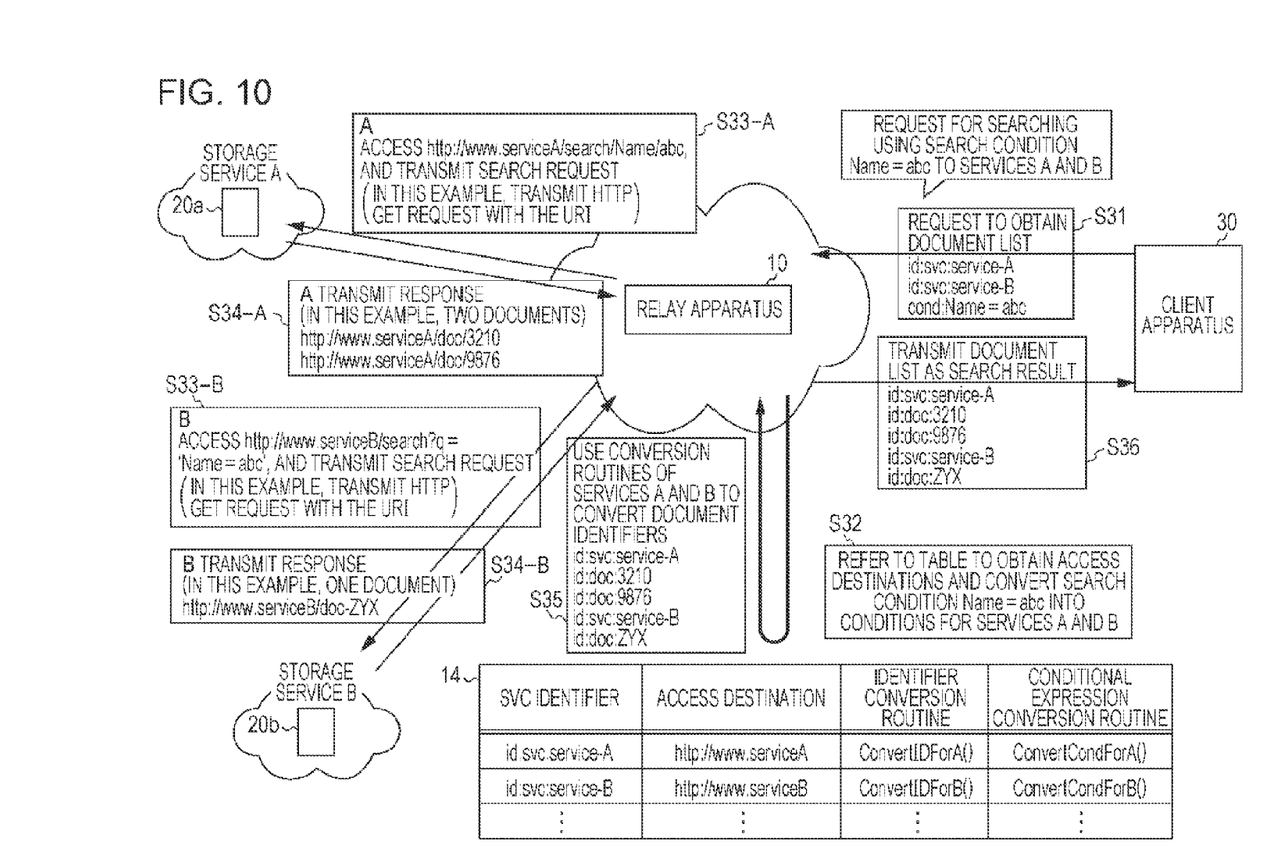
FIG. 10 is a diagram for describing an operation of searching for content.

An operation of searching multiple storage services for content will be described with reference to FIG. 10. In the exemplary operation, an operation performed when a user specifies a conditional expression (Name=abc) and searches the storage service A and the storage service B for content will be described.

A user U operates the operation unit 33, and transmits an instruction to search the storage service A and the storage service B for content whose file name is "abc". The controller 31 of the client apparatus 30 transmits search request data to the relay apparatus 10 in accordance with information which is output from the operation unit 33 (in step S31). The search request data includes service identifiers for identifying storage services and a conditional expression indicating a search condition. Specifically, in the exemplary operation, the search request data includes "id:svc:service-A" and "id:svc:service-B" as service identifiers and "Name=abc" as a conditional expression.

Receiving the search request data from the client apparatus 30, the controller 11 of the relay apparatus 10 refers to the stored data in the management table storage area 14 to specify conditional expression conversion routines corresponding to the service identifiers included in the received search request data. The controller 11 of the relay apparatus 10 uses the specified conditional expression conversion routines to convert the conditional expression included in the received search request data into conditional expressions in the formats used in the storage services (in step S32). In the exemplary operation, the conditional expression "Name=abc" is converted into "search/Name/abc" by using a conditional expression conversion routine "ConvertCondForA( )", and is converted into "search?q='Name=abc'" by using a conditional expression conversion routine "ConvertCondForB( )".

The controller 11 uses access destination information corresponding to the service identifiers included in the search request data received in step S31, to transmit search request data to the storage service providing apparatuses 20 (in steps S33-A and S33-B). In the exemplary operation, the controller 11 transmits an HTTP GET request in which "http://www.serviceA/search/Name/abc" is specified as a URI to the storage service providing apparatus 20a. The controller 11 transmits an HTTP GET request in which "http://www.serviceB/search?q='Name=abc'" is specified as a URI to the storage service providing apparatus 20b.

Receiving a search request data transmitted from the relay apparatus 10, a storage service providing apparatus 20 uses the conditional expression specified in the received search request data to search for content, and transmits a content list obtained through searching to the relay apparatus 10 (in steps S34-A and S34-B). At that time, a storage service providing apparatus 20 uses a content identifier in the format predetermined in the storage service for the storage service providing apparatus 20. Specifically, in the exemplary operation in FIG. 10, the storage service providing apparatus 20a transmits "http://www.serviceA/doc/3210" and "http://www.serviceA/doc/9876" as content identifiers to the relay apparatus 10. The storage service providing apparatus 20b transmits "http://www.serviceB/doc-ZYX" as a content identifier to the relay apparatus 10.

Receiving content lists from the storage service providing apparatuses 20, the controller 11 of the relay apparatus 10 uses identifier conversion routines stored in the management table to convert received content identifiers (in step S35). In the example illustrated in FIG. 10, a content identifier "doc/3210" is converted into "id:doc:3210" by using an identifier conversion routine. The controller 11 transmits a list of the content identifiers obtained through conversion to the client apparatus 30 (in step S36). The client apparatus 30 displays the list of content identifiers received from the relay apparatus 10 on the display unit 34.

In systems of the related art, when pieces of content are distributed to and stored in multiple storage services, it is not possible for a user to search desired content by performing a single operation. In contrast, in the exemplary embodiment, in the case where the storage service A and the storage service B are searched for content, a user performs a single operation of specifying a search condition, and does not need to perform an operation for each of the storage services.

Modified Embodiments

The above-described exemplary embodiment is an example of the present invention, and may be modified as follows. Modified embodiments described below may be combined with each other.

(1) The configuration of the communication system 1 is not limited to the configuration described in the above-described exemplary embodiment. For example, the number of units included in the communication system 1 may be different from the number of units in the exemplary embodiment. For example, in the above-described exemplary embodiment, the example is described in which the communication system 1 is provided with one image output device 40. The number of image output devices 40 is not limited to one, and may be more than one. In addition, in the above-described exemplary embodiment, one storage service providing apparatus provides one storage service. The present invention is not limited to this, and multiple servers may provide one storage service.

In the above-described exemplary embodiment, the case where three storage services are provided is described. However, the number of storage services are not limited to three, and may be more than or less than three.

(2) In the above-described exemplary embodiment, the configuration is employed in which a service identifier for identifying a storage service and access destination information indicating information used to access a storage service providing apparatus 20 are separately used. The present invention is not limited to this, and a service identifier and access destination information may be unified into one piece of data. For example, a configuration may be employed in which a URI used to access a storage service providing apparatus 20 is used to identify a storage service.

(3) The image output device 40 described in the above-described exemplary embodiment is an exemplary client apparatus to which the relay apparatus 10 provides a service. Such a client apparatus may be another apparatus, such as a personal computer (PC), a tablet PC, or a cellular phone. In addition, the example in which the client apparatus 30 is connected to a network via the LAN 60 is described. However, the present invention is not limited to this, and a configuration may be employed in which the client apparatus 30 is capable of communicating with the relay apparatus 10 or the image output device 40 via a wireless or wired public line.

(4) A program executed in the relay apparatus 10, the storage service providing apparatuses 20, the client apparatus 30, or the image output device 40 may be downloaded via a communication line such as the Internet. Alternatively, the program may be provided by recording the program in a computer-readable recording medium, such as a magnetic recording medium (for example, a magnetic tape or a magnetic disk), an optical recording medium (for example, an optical disk), a magneto-optical recording medium, or a semiconductor memory.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A relay apparatus comprising:
   a storage configured to store a service identifier, access destination information, and a conversion routine in such a manner that the service identifier, the access destination information, and the conversion routine are associated with each other, for each of a plurality of storage services, the service identifier being an identifier for identifying a storage service among the plurality of storage services, the access destination information indicating information used to access a server which provides the storage service, the conversion routine indicating a rule for converting a content identifier for identifying content and a folder between a format used in the server providing the storage service and a format used in a client apparatus;
   a request data reception unit configured to receive first request data for displaying a list of documents in a document list in a folder which is managed in the storage service, the first request including a service identifier, a folder identifier and a specified condition from the client apparatus;
   a first conversion unit configured to access and retrieve, from the storage, a conversion routine associated with the service identifier included in the first request data and perform a first conversion to convert the folder identifier included in the first request data into the format used in the storage service based on the retrieved conversion routine;
   a request data transmission unit configured to transmit, to the server providing the storage service, second request data for one or more content identifiers corresponding to the list of the documents, the second request including the converted folder identifier obtained through the conversion performed by the first conversion unit, in accordance with the access destination information stored in the storage in such a manner that the access destination information is associated with the service identifier included in the first request data received by the request data reception unit;
   a content identifier reception unit configured to receive the one or more content identifiers corresponding to the list of documents in the converted folder transmitted from the server as a response to the second request data transmitted by the request data transmission unit;
   a second conversion unit configured to perform a second conversion to convert the one or more content identifiers after receiving the content identifiers from the server by the content identifier reception unit into the format used in the client apparatus in accordance with a conversion routine stored in the storage in such a manner that the conversion routine is associated with the service identifier of the storage service provided by the server which has transmitted the content identifier; and
   a content identifier transmission unit configured to transmit the content identifier obtained through the conversion performed by the second conversion unit, as a response to the first request data received by the request data reception unit to the client apparatus,
   wherein the specified condition is a conditional expression indicating a search condition for content and
   wherein the first conversion is performed before the request for one or more content identifiers is transmitted to the server, and the second conversion is performed after the request for one or more content identifiers is transmitted to the server.

2. The relay apparatus according to claim 1,
   wherein, in the case where the first request data received by the request data reception unit from the client apparatus includes a plurality of service identifiers and a plurality of folder identifiers,
   the first conversion unit is further configured to convert the folder identifiers included in the first request data received by the request data reception unit, for each of the plurality of service identifiers included in the first request data, in accordance with a conversion routine stored in the storage in such a manner that the conversion routine is associated with the service identifier, so as to generate a plurality of converted folder identifiers corresponding to the plurality of respective service identifiers,
   the request data transmission unit is further configured to transmit a plurality of pieces of second request data, each of which is generated for a corresponding one of the plurality of converted folder identifiers generated by the first conversion unit and each of which includes the specified condition, in accordance with access destination information stored in the storage in such a manner that the access destination information is associated with the service identifier corresponding to the specified condition, the content identifier reception unit is further configured to receive a plurality of content identifiers transmitted from a plurality of servers, as responses to the plurality of pieces of second request data transmitted by the request data transmission unit, the second conversion unit is further configured to convert each of the plurality of content identifiers received by the content identifier reception unit from a corresponding one of the plurality of servers, in accordance with a conversion routine stored in the storage in such a manner that the conversion routine is associated with the service identifier of the storage service provided by the server which has transmitted the content identifier, and the content identifier transmission is further configured to transmit the plurality of content identifiers obtained through the reception from the plurality of servers performed by the content identifier reception unit and through the conversion performed by the second conversion unit, to the client apparatus as a response to the first request data received by the request data reception unit.

3. The relay apparatus according to claim 1,
wherein the folder identifier identifies a folder storing content.

4. The relay apparatus according to claim 2,
wherein the folder identifier identifies a folder storing content.

5. A system comprising:
a client apparatus; and
a relay apparatus,
wherein the client apparatus includes:
a transmission unit configured to transmit first request data which is generated for each of a plurality of storage folders and which includes a folder identifier for identifying the storage folder and a specified condition indicating a condition for specifying one or more pieces of content, to the relay apparatus, and
a reception unit configured to receive a content identifier transmitted from the relay apparatus as a response to the first request data which has been transmitted by the transmission unit, and
wherein the relay apparatus includes:
a storage configured to store a service identifier, access destination information, and a conversion routine in such a manner that the service identifier, the access destination information, and the conversion routine are associated with each other, for each of the plurality of storage services, the service identifier being an identifier for identifying a storage service among the plurality of storage services, the access destination information indicating information used to access a server which provides the storage service, the conversion routine indicating a rule for converting a content identifier for identifying content and a folder between a format used in the server providing the storage service and a format used in the client apparatus,
a request data reception unit configured to receive the first request data for displaying a list of documents in a document list in a folder which is managed in the storage service, the first request including a service identifier, a folder identifier and a specified condition from the client apparatus,
a first conversion unit configured to access and retrieve, from the storage, a conversion routine associated with the service identifier included in the first request data and perform first conversion to convert the folder identifier included in the first request data into the format used in the server storage service based on the retrieved conversion routine;

a request data transmission unit configured to transmit, to the server providing the storage service, second request data for one or more content identifiers corresponding to the list of the documents, the second request including the converted folder identifier obtained through the conversion performed by the first conversion unit, in accordance with the access destination information stored in the storage in such a manner that the access destination information is associated with the service identifier included in the first request data received by the request data reception unit, a content identifier reception unit configured to receive the one or more content identifiers corresponding to the list of documents in the converted folder transmitted from the server as a response to the second request data transmitted by the request data transmission unit, a second conversion unit configured to perform a second conversion to convert the one or more content identifiers after receiving the content identifiers from the server by the content identifier reception unit into the format used in the client apparatus in accordance with a conversion routine stored in the storage in such a manner that the conversion routine is associated with the service identifier of the storage service provided by the server which has transmitted the content identifier, and a content identifier transmission unit configured to transmit the content identifier obtained through the conversion performed by the second conversion unit, as a response to the first request data received by the request data reception unit to the client apparatus, wherein the specified condition is a conditional expression indicating a search condition for content, and wherein the first conversion is performed before the request for one or more content identifiers is transmitted to the server, and the second conversion is performed after the request for one or more content identifiers is transmitted to the server.

6. A non-transitory computer readable medium storing a program causing a computer to execute a process comprising:

storing a service identifier, access destination information, and a conversion routine in such a manner that the service identifier, the access destination information, and the conversion routine are associated with each other, for each of a plurality of storage services, the service identifier being an identifier for identifying the storage service among the plurality of storage services, the access destination information indicating information used to access a server which provides the storage service, the conversion routine indicating a rule for converting a content identifier for identifying content and a folder between a format used in the server providing the storage service and a format used in a client apparatus;

receiving first request data for displaying a list of documents in a document list in a folder which is managed in the storage service, the first request including a service identifier, a folder identifier and a specified condition from the client apparatus;

accessing and retrieving, from the storage, a conversion routine associated with the service identifier included in the first request data;

performing a first conversion to convert the folder identifier included in the first request data into the format used in the storage service based on the retrieved conversion routine;

transmitting, to the server providing the storage service, second request data for one or more content identifiers corresponding to the list of the documents, the second request including the converted folder identifier specified condition obtained through the conversion, in accordance with the access destination information stored in such a manner that the access destination information is associated with the service identifier included in the received first request data;

receiving the one or more content identifiers corresponding to the list of documents in the converted folder transmitted from the server as a response to the transmitted second request data;

performing a second conversion to convert the received one or more content identifiers from the server into the format used in the client apparatus in accordance with a conversion routine stored in such a manner that the conversion routine is associated with the service identifier of the storage service provided by the server which has transmitted the content identifier; and transmitting the content identifier obtained through the conversion, as a response to the received first request data to the client apparatus, wherein the specified condition is a conditional expression indicating a search condition for content, and wherein the first conversion is performed before the request for one or more content identifiers is transmitted to the server, and the second conversion is performed after the request for one or more content identifiers is transmitted to the server.

7. The relay apparatus according to claim 1, wherein the conditional expression comprises an equation used to search for the content.

* * * * *